Sept. 24, 1957 W. E. BUECHELE ET AL 2,807,203
DEEP FAT FRYING
Filed Oct. 11, 1952 4 Sheets-Sheet 3
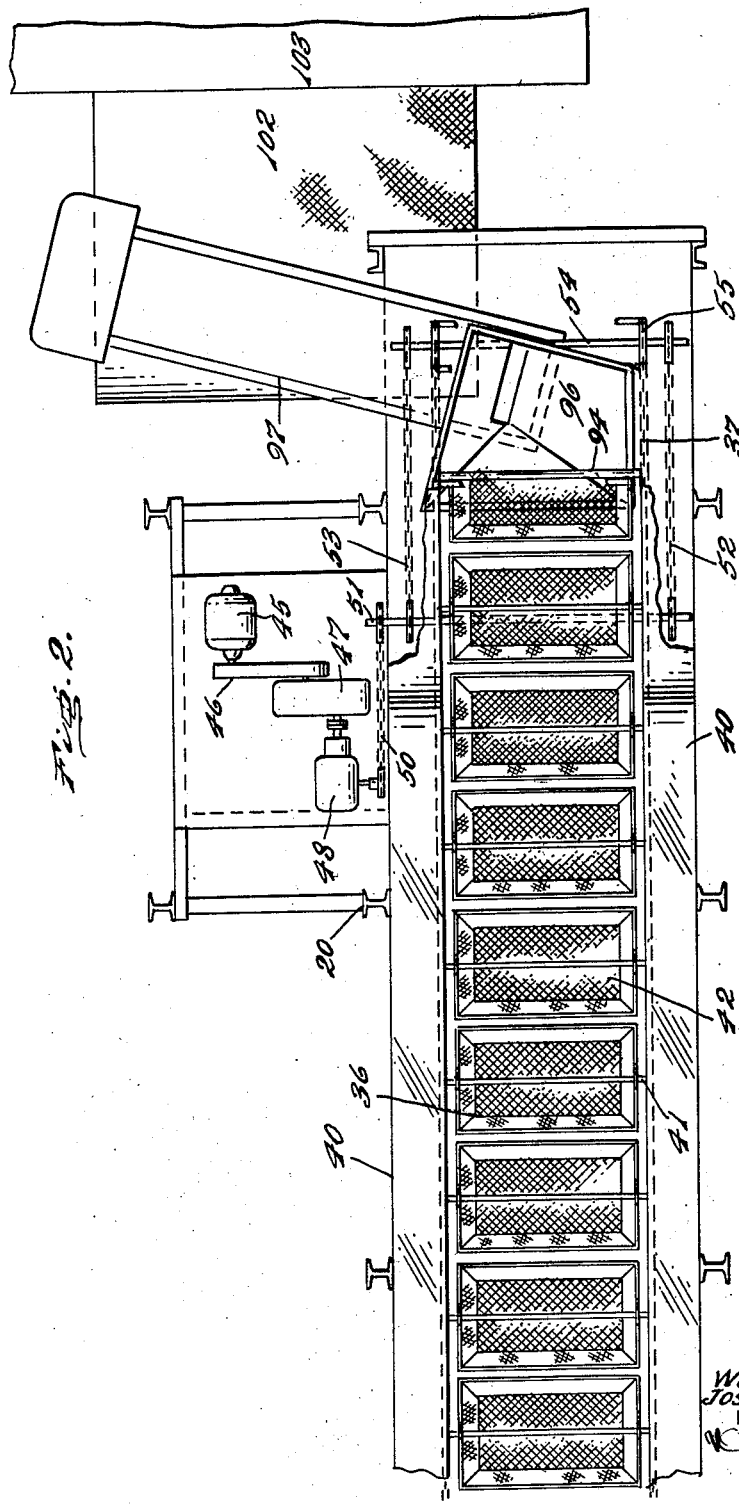
INVENTOR
Walter E. Buechele
Joseph W. Adacusky
BY
ATTORNEYS.

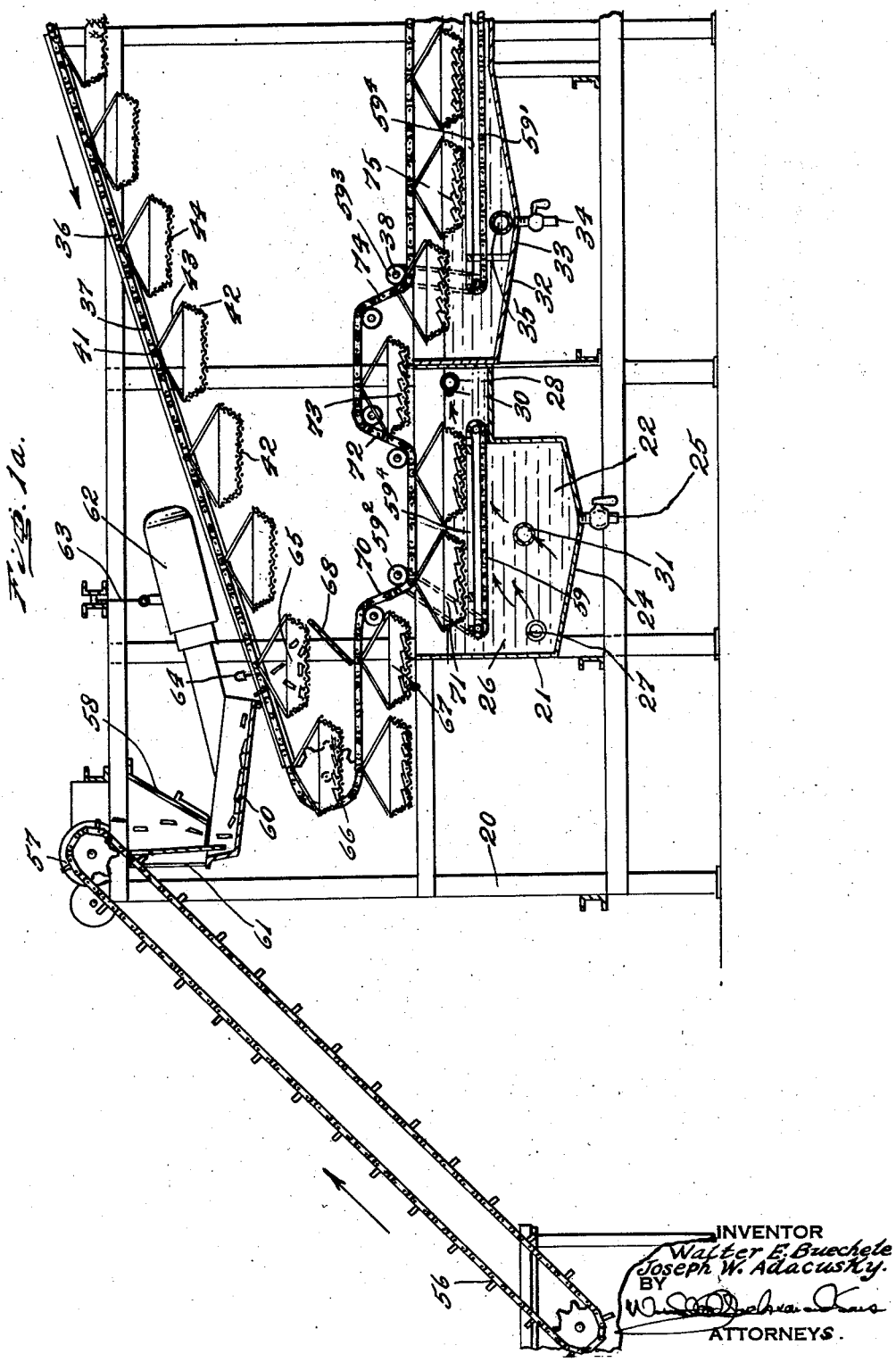

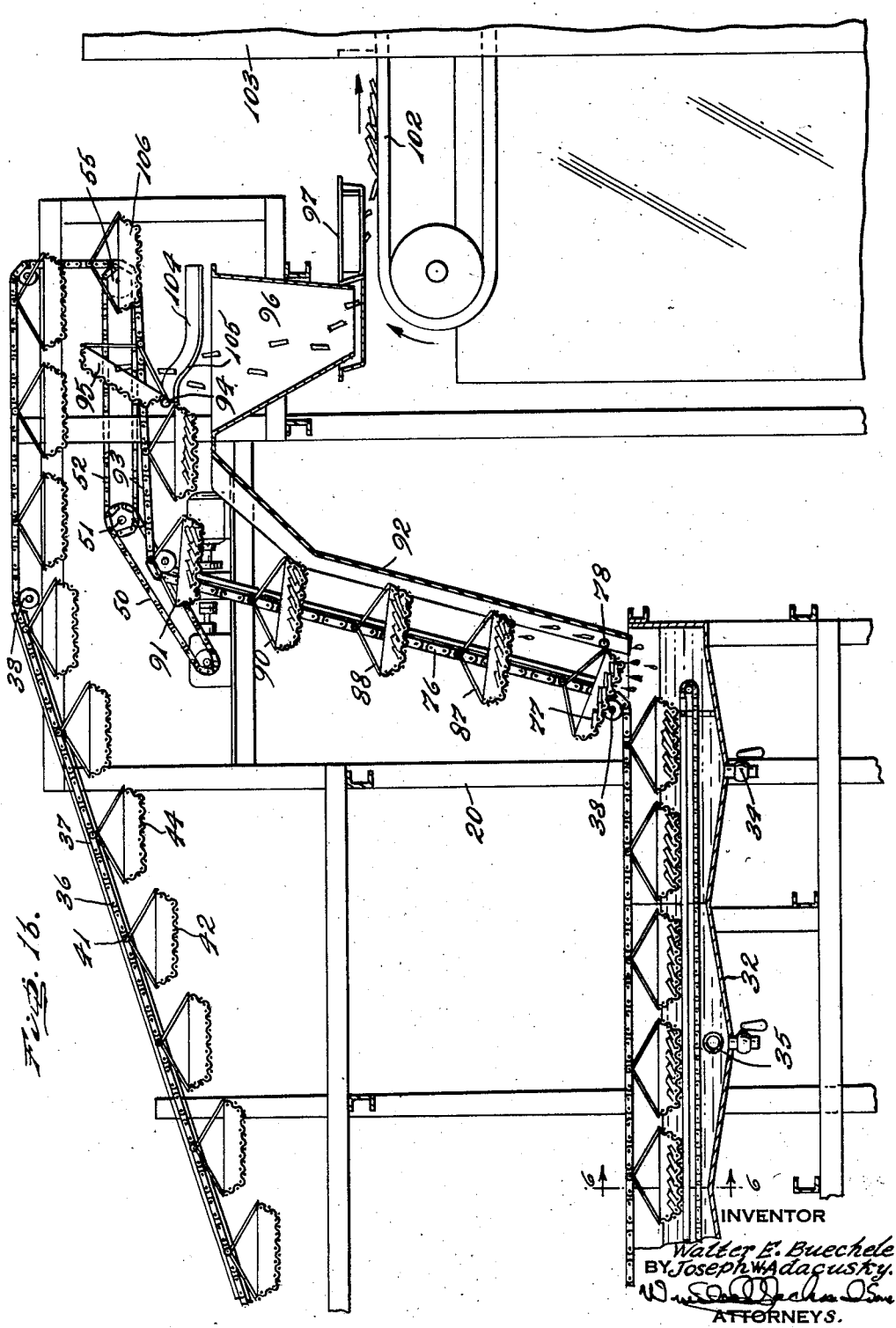

Sept. 24, 1957 W. E. BUECHELE ET AL 2,807,203
DEEP FAT FRYING
Filed Oct. 11, 1952 4 Sheets-Sheet 4
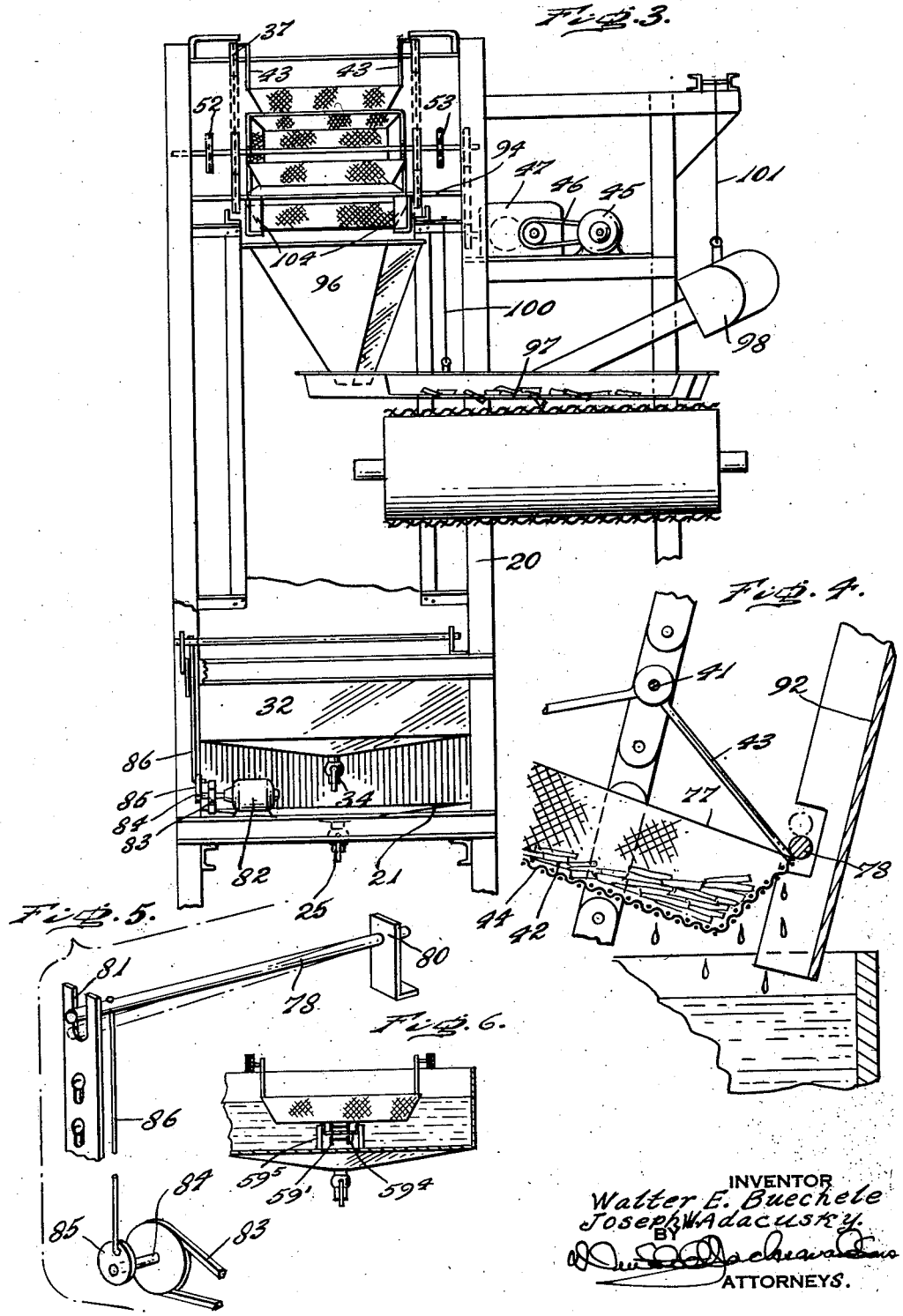
INVENTOR
Walter E. Buechele
Joseph W. Adacusky
BY
ATTORNEYS.

United States Patent Office 2,807,203
Patented Sept. 24, 1957

2,807,203
DEEP FAT FRYING

Walter E. Buechele, Upper Darby, and Joseph W. Adacusky, Philadelphia, Pa., assignors to Brock & Company, Inc., a corporation of Pennsylvania Application October 11, 1952, Serial No. 314,278

4 Claims. (Cl. 99—404)

The present invention relates to deep fat frying especially of French fried potatoes, and particularly where the French fried potatoes are to be frozen.

A purpose of the invention is to obtain a higher retained moisture content in frozen French fried potatoes.

A further purpose is to avoid excessive grease penetration of French fried potatoes, particularly where they are frozen.

A further purpose is to secure crispier and more tasty frozen French fried potatoes.

A further purpose is to immerse the French fried potato pieces first in oil at 350 to 380° F. and preferably at 375° F. for from 15 to 30 seconds and preferably from 20 to 30 seconds, most desirably about 20 seconds, and then to immerse the pieces of potato immediately in a bath of oil at a temperature between 250 and 300° F. and preferably at about 275° F. for a time of from 2 to 5 minutes and preferably about 3½ minutes, thus retaining increased moisture and reducing penetration of oil.

A further purpose is to trigger the discharge of French fried potatoes from a feeding apron to a conveyor tray and obtain more even distribution over the conveyor tray by vibrating the apron and preferably vibrating the apron exactly at the moment of discharge.

A further purpose is to provide a reverse bend in the conveyor with self leveling trays placed one beneath another at the feeding position and to employ a baffle to direct potato pieces falling from the upper tray into the lower tray.

A further purpose is to collect potato fragments in the frying bath on a shelf adjoining the screened outlet of the fat circulating system so that the fragments can be removed from the shelf by skimming.

A further purpose is to engage the tray immediately after it leaves the deep fat bath by a vibrating bar and preferably to tilt the tray so as to shift the potatoes forward.

A further purpose is to offset the position of successive draining trays and maintain the trays shifted forward so that the oil dropping from an uppermost tray will clear the tray below it.

A further purpose is to up-end the trays for discharging, preferably to hold a tray after discharging so that it will not strike violently against adjoining trays, and preferably later to release the tray and permit it to swing lightly against the discharging tray to dislodge potatoes left in that tray.

A further purpose is to provide a conveyor underneath the trays in the oil to steady the trays as they advance and prevent the danger of tilting.

Further purposes appear in the specification and in the claims.

In the drawings we have chosen to illustrate one only of the numerous embodiments in which our invention may appear, selecting the form shown from the standpoints of convenience in illustration, satisfactory operation, and clear demonstration of the principles involved.

Figure 1 is a diagrammatic central vertical section of the deep fat fryer of the invention, the view being divided between two sheets, one of which shows the initial portion of the mechanism on Figure 1a and the other of which shows the final part on Figure 1b.

Figure 2 is a fragmentary top plan view of the mechanism of the invention at the discharge end.

Figure 3 is an end elevation from the discharge end, with the final conveyor sectioned away.

Figure 4 is an enlarged fragment showing the vibration of the tray at the point of draining.

Figure 5 is a fragmentary perspective showing the mechanism for vibrating at the point of draining.

Figure 6 is a fragmentary section on the line 6—6 of Figure 1b showing the steadying conveyor.

At the present time, extensive use is being made of French fried potatoes which are prepared and fried and then frozen immediately after frying. Considerable difficulty has been encountered in obtaining a tasty crisp product which is free from excessive grease penetration and adherence. The present invention is designed primarily to improve the quality of frozen French fried potatoes, and to facilitate the production of the same.

It is evident from the work which we have done that a major cause of poor taste in frozen French fried potatoes is the tendency to dehydrate the potato pieces excessively during frying, and permit grease penetration to replace the moisture which has been removed. The present invention is designed particularly to keep moisture in the potato, and prevent grease penetration or adherence. With this purpose in view, the potato pieces are first caused to form a sealing skin by frying for a time of 15 to 30 seconds and preferably 20 to 30 seconds at a temperature of 350 to 380° F. and preferably about 375° F. This causes the potato to retain moisture and makes it relatively impermeable to penetration of oil. We then proceed with the frying operation at a relatively lower temperature of 250 to 300° F. and preferably 275° F. for a time of 2 to 5 minutes and preferably about 3½ minutes. This gives a potato which is crisp but not hard or tough.

The process of the present invention assures of uniform cooking of the potatoes and avoids the tendency of fragments which have become separated from the dipping trays and have been burned while floating around in the oil bath from becoming mixed with the potatoes which are being cooked. In accordance with the present invention a circulation system is used which carries the fragments which have left the trays to a shelf which is accessible for skimming, thus preventing building up a high concentration of such fragments floating around the oil bath which are likely to become mixed with the product.

One of the difficulties previously encountered has been the tendency of the potatoes to bunch in the trays and prevent uniform access by the oil. This is prevented by feeding the potato pieces into the trays from an apron, and vibrating the apron so that the potato pieces will be widely spread in the trays, and desirably triggering the vibration so that it will occur when the tray reaches the feeding point.

The conveyor is so arranged adjacent the feeding point that two upwardly directed trays are placed one below another, and potato pieces which fail to enter the upper tray are guided into the lower tray, and thus prevented from dropping into the fat bath and becoming floaters which may cause difficulty by becoming mixed with the product.

In accordance with the invention, precautions are taken to remove as much as possible of the adhering oil from the potatoes after they leave the oil bath. This is done by tilting the trays so that the potatoes change their relationship with one another, and at the same time vibrating so as to remove adhering oil. The successive trays at the point of draining are arranged so that the oil dropping from upper trays will clear lower trays and thus there will not be any tendency to redeposit cooler oil on the potatoes in lower trays.

At the point of discharge, the tray is tilted somewhat more than 90°, and as it returns to upright position is steadied by a track against violent swinging, and then desirably released and permitted to swing lightly against the up-ended tray to shake out any adhering potatoes.

Considering now the structure of the drawings, a frame 20 supports a sealing deep fat frying tank 21 closed at the bottom and sides and open at the top. The tank has a deep portion 22 and at its outlet end a shelf or step 23 which produces a comparatively shallow portion. The bottom slopes to the center at 24 and a drainage connection 25 is provided. A deep fat bath 26 remains in the tank suitably to a point near the top, and is continuously recirculated through a pump outside the tank and not shown, the recirclating stream entering at the bottom near the inlet end through a connection 27 and leaving at the top near the outlet end through a connection 28 having a series of screened openings 30. The oil is heated to the desired temperature by thermostatically controlled electric heaters 31 extending through the tank. The tank 21 is maintained at a temperature of 350 to 380° F., and preferably about 375° F. suitably cooking the potatoes for a time of 15 to 30 seconds and preferably about 20 seconds.

Forwardly positioned with respect to the tank 21 is a second deep fat frying tank 32 which is desirably elongated, closed at the bottom and sides and open at the top. The tank 32 has a series of bottom draining sloping portions 33 provided with drain connections 34. It is usually found not to be necessary to circulate the oil in the tank 32, as the potato fragments which may present a hazard in the tank 21 normally do not occur in appreciable quantities in the tank 32. It will be evident however that the oil can be circulated in the tank 32 if desired.

The temperature suitably at 250 to 300° F. and preferably 275° F. is maintained in tank 32 by suitable thermostatically controlled electric heaters 35 extending across the tank near the bottom.

Positioned above the tanks is a conveyor 36 comprising spaced chains 37 which are guided at suitable points where the direction changes or support is needed by rollers 38. The chains are also housed and guided by channels 40 secured to the frame and following the course of the conveyor, but omitted for clarity in Figure 1 but shown in Figure 2.

Extending across between the chains at intervals are tray pivoting bars 41 which are capable of rotating with respect to the chains and support trays or baskets 42 which have upper supports 43 and lower screen or perforated bottoms and sides 44 which receive the potatoes.

The conveyor is driven by a motor 45 through a chain drive 46 to speed reducers 47 and 48 which drive through a chain drive 50 to a shaft 51 which extends across to the opposite side of the conveyor and is interconnected by chain drives 52 and 53 to shaft 54 supported on suitable bearings and driving the respective conveyor chains through sprockets 55 which engage the conveyor chains. The shafts have suitable bearing support in the frame.

Suitably diced potato pieces are introduced to the fryer by conveyor 56 traveling upwardly and driven by drive 57, the potatoes being discharged through hopper 58 on to forwardly and downwardly inclined apron 60. The inclination of the apron is less than the angle of repose of the potato pieces resting on the apron, so that the potato pieces will not discharge from the apron merely by sliding off under gravity action. The apron is supported by cables 61 which engage the rearward end, and at the forward end is interconnected with vibrating machine 62 which is supported by cable 63 and will desirably be a Syntron vibrator as well known in the art, which causes the apron to be shaken forwardly and backwardly when the vibrator is electrically energized by starting its driving motor. An electric switch 64 is desirably placed with its feeler in position to be tripped by the pivot bar 41 of a tray which reaches loading position 65, thus energizing the vibrator 62 momentarily and causing potato pieces on the apron to be thrown forward in widely distributed relationship into the tray at loading position 65 to load the tray.

Immediately forward of the loading position 65 the conveyor makes a reverse bend at 66 and as the trays are self leveling they turn around with respect to the conveyor chain and one of the trays reaches a position 67 beneath the loading position. In this position the tray is able to catch potato pieces which drop from the loading position and this is aided by a downwardly sloping baffle 68 which directs such overflow potato pieces into the lower tray.

From the loading position the conveyor after making the reverse bend dips downwardly at 70 bringing successive trays into the sealing cooking position 71 in which the potatoes in the tray are immersed in the deep fat bath 26. The conveyor at the forward end of the deep fat tank rises upwardly at 72 and at a tray position 73 carries the trays over the separating wall between sealing cooking tank 21 and second frying tank 32, after which the conveyor is carried downwardly at 74 and brings the tray into deep fat frying position at 75 to travel along beneath the level of the deep fat bath of the second frying tank 32.

In each of the deep fat frying tanks there is a centrally located horizontal conveyor 59 or 59', as the case may be, driven by a drive $59^2$ or $59^3$ as the case may be which is interconnected with the main conveyor. The conveyors have upper forwardly extending stretches moving through channels $59^4$ supported by legs $59^5$ from the tank. The forward stretch moves immediately beneath the trays in the tank and steadies them traveling forward at the same rate as the trays. The conveyor is shown in detail in Figure 6.

At the forward end of the second frying tank the conveyor begins to travel diagonally upwardly and forwardly at 76, raising the tray which has just left the second deep fat bath to position 77 at which the forward end of the tray encounters vibrating bar 78 which is best seen in Figures 4 and 5. The bar extends fully across the tray, and suitably has bearing support at 80 at one end, and has freedom to vibrate vertically at the other end in a guide slot 81 on the frame. The vibratory action is provided by vibrating motor 82 which through belt and pulley system 83 drives shaft 84 carrying eccentric 85 which pivotally connects to connecting rod 86 which at its upper end is secured to the vibrating bar 78 as by welding.

The vibrating bar is close enough to the tray to tilt the tray at the position 77 and cause the potato pieces to move to the forward end and cause the successive trays above the position 77 at 87, 88, 90 and 91, each a little forward of the other because of the forward conveyor motion, to tilt slightly due to the overloading of the forward portion, so that the dripping of the fat which is promoted by the vibrating bar 78 and continues in the successive upper positions does not cause fat to drop on potatoes in lower baskets, the drippings falling forwardly and clear of the lower basket and being received by a dripping return chute 92 which brings the drippings back into the fat bath.

The conveyor now moves across through a substantially horizontal portion 93 to a position at which the successive trays encounter tilting bar 94 which extends across beneath the chains and up-ends the trays as shown at position 95, dropping the potatoes into hopper 96 from the bottom of which the potatoes discharge to apron 97 which is continuously vibrated by mechanism at 98 as well known. The apron is suspended by cables 100 and the vibrating mechanism is suspended by cables 101. From the vibrating discharge apron the potatoes which have now finished the frying operation pass to freezing conveyor 102 which carries them into quick freezing chamber 103, in case they are to be frozen.

In operation it will be evident that the potatoes are loaded into a tray at the loading position 65 by vibrating of the apron 60 desirably in response to the movement of the conveyor bringing that tray to the loading position. Any excess of potatoes are picked up by a basket below the basket being loaded. The successive loaded trays are then immersed in the first sealing deep fat bath, and any floating potatoes in that bath are taken by the recirculating stream to a shelf at the forward end from which they can be removed by hand skimming. Trays are then carried to the second deep fat frying bath, after which they are removed, tilted, and vibrated to eliminate excess of grease, and carried upwardly and forwardly in a slightly inclined tray position so that dripping grease will not encounter potatoes below. The trays are then up-ended to discharge the potatoes. If the up-ended tray at 95 were allowed to swing free there would be danger that it would strike other trays and cause damage, and therefore a cam track 104 is provided beneath the up-ended tray as it passes beyond the tilting bar 94, which gradually curves downwardly at 105 and thus permits the tray to return to upright position as the conveyor moves forwardly.

As soon as the upward moving tray 106 is released by the track 104 it is free to swing and by swinging lightly touches the discharging tray 95, shaking out any potatoes which tend to adhere.

In view of our invention and disclosure variations and modifications to meet individual whim or particular need will doubtless become evident to others skilled in the art, to obtain all or part of the benefits of our invention without copying the process and machine shown, and we therefore claim all such insofar as they fall within the reasonable spirit and scope of our claims.

Having thus described our invention, what we claim as new and desire to secure by Letters Patent is:

1. In a deep fat fryer, a tank adapted to contain a bath of frying fat, a conveyor having trays which are manipulated to immerse the trays beneath the fat, a vibrating bar located along the path of the conveyor above the outlet end of the tank, and means for vibrating the vibrating bar, the vibrating bar being in position to engage and shake the trays as they rise above the fat and remove the excess of fat.

2. In a deep fat fryer, a tank adapted to contain a bath of fat, a conveyor having traps and traveling across the tank and immersing the trays in the tank and then carrying the trays upwardly at the outlet end of the tank, the trays being swingable with respect to the conveyor, a vibrating bar in the path of movement of the trays and engaging and tilting the trays as the conveyor moves upwardly at the outlet end of the tank, thereby rearranging the potatoes at one end of the successive trays, and means for vibrating the vibrating bar to remove excess fat.

3. In a deep fat fryer, a tank adapted to contain a bath of frying fat, a conveyor moving across the tank and having trays swingable with respect to the conveyor, the trays entering the fat, the conveyor then moving diagonally upwardly and forwardly at the outlet end of the tank so that successive trays are vertically above and partially forwardly placed with respect to those below, and a tipping bar engaging each lowermost tray and tipping the same as the tray rises above the bath, whereby the trays as they move upwardly have the potatoes accumulated in the forward end and tend to drain from the forward end clear of one another without having the drippings of the higher trays dropping into the lower trays.

4. In a deep fat fryer, a tank adapted to contain a bath of oil, a conveyor having individual trays swingable on the conveyor and adapted to strike against one another when they swing, a conveyor moving across the tank and immersing the trays into the oil and then moving upward at the outlet end, a tipping bar in line with the conveyor at a position above the tank for engaging and tipping the trays, a track beyond the tipping bar engaging the tipped trays and restoring the same to upright position, and means for moving the conveyor beyond the track upward and thereby permitting the trays to swing and strike against a tray which is being tipped.

References Cited in the file of this patent

UNITED STATES PATENTS

| | | |
|---|---|---|
| 503,870 | McCaslin | Aug. 22, 1893 |
| 671,825 | Johnson | Apr. 9, 1901 |
| 1,216,230 | Horton | Feb. 13, 1917 |
| 1,252,613 | Phelps | Jan. 8, 1918 |
| 1,381,347 | Schaller | June 14, 1921 |
| 2,013,906 | Boiardi | Sept. 10, 1935 |
| 2,056,884 | Brunstetter | Oct. 6, 1936 |
| 2,179,035 | Perry | Nov. 7, 1939 |
| 2,207,316 | Ferry | July 9, 1940 |
| 2,475,523 | Schroeder | July 5, 1949 |
| 2,528,069 | McGihon | Oct. 31, 1950 |
| 2,538,937 | Foster | Jan. 23, 1951 |
| 2,616,359 | Pierson | Nov. 4, 1952 |
| 2,655,928 | Herold | Oct. 20, 1953 |

FOREIGN PATENTS

| | | |
|---|---|---|
| 69,996 | Norway | Feb. 4, 1946 |